J. SCHOFIELD.
Flooring Clamp.
No. 201,709. Patented March 26, 1878.
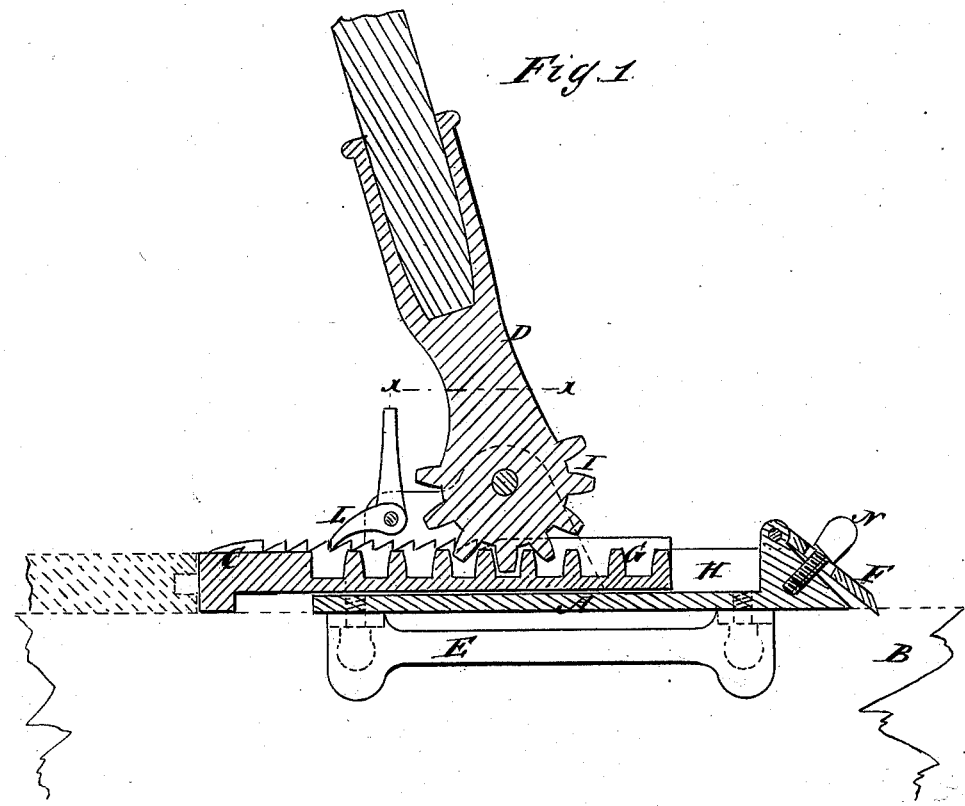
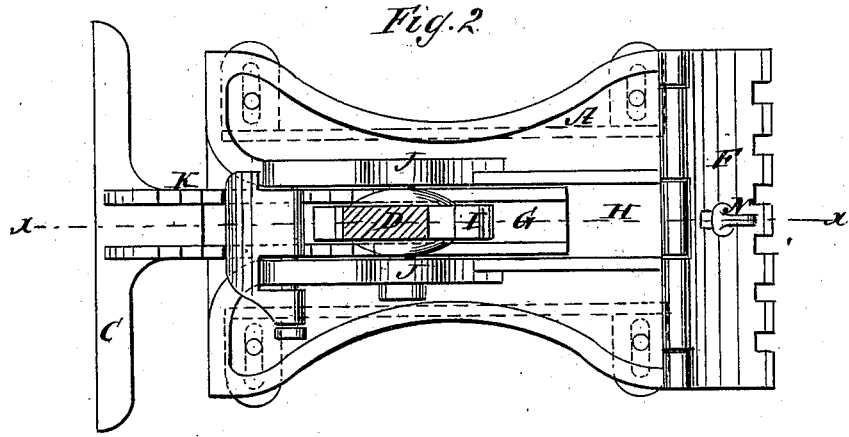
WITNESSES:
INVENTOR:

UNITED STATES PATENT OFFICE.

JOHN SCHOFIELD, OF CHEYENNE CITY, WYOMING TERRITORY.

IMPROVEMENT IN FLOORING-CLAMPS.

Specification forming part of Letters Patent No. 201,709, dated March 26, 1878; application filed March 13, 1878.

*To all whom it may concern:*

Be it known that I, JOHN SCHOFIELD, of Cheyenne City, in the county of Laramie and Territory of Wyoming, have invented an Improvement in Flooring-Clamps, of which the following is a specification:

My invention consists of a sliding presser with a toothed shank and a toothed segmental lever for working it, mounted on a base-plate to rest on the joist, and having a dog for holding it against sliding backward, making a simple and efficient contrivance, which is also applicable for clamping other work.

Figure 1 is a sectional elevation of my improved clamp, taken on the line $x\ x$ of Fig. 2. Fig. 2 is a horizontal section taken on line $y\ y$ of Fig. 1.

Similar letters of reference indicate corresponding parts.

A is a base-plate to rest on the joist B, for holding the sliding clamp C, and the lever D, for working it. On the under side it has adjustable cleats E, for fitting against the sides of joists of different widths, and at the rear it has the dog F, to hold it from sliding back.

The clamp has a toothed shank, G, working in a groove, H, in the base-plate, and the lever has a toothed segment, I, to work the clamp, said lever being pivoted over the shank in ears J of the plate.

The shank of the clamp also has ratchet-notches K, for a holding-pawl, L, to keep the work up tight until it is secured. The dog F is hinged to the base-plate, and it has an adjusting-screw, N, to regulate the projection below the base-plate, as required for entering different kinds of wood, more or less.

Having thus described my invention, I claim as new and desire to secure by Letters Patent—

The combination of the base-plate having cleats E, dog F, groove H, and detent L, the clamps C, having toothed shank G and ratchet K, and the lever D, having toothed head I, all constructed and arranged as and for the purpose specified.

JOHN SCHOFIELD.

Witnesses:
J. C. REMINGTON,
E. SPARKS.